United States Patent
Murakami et al.

(10) Patent No.: US 8,783,695 B2
(45) Date of Patent: Jul. 22, 2014

(54) MOTORCYCLE

(71) Applicant: Showa Corporation, Saitama (JP)

(72) Inventors: Yosuke Murakami, Shizuoka (JP); Tadashi Hachisuka, Shizuoka (JP); Takahiro Kasuga, Tochigi (JP); Fumiaki Ishikawa, Tochigi (JP)

(73) Assignee: Showa Corporation (JP)

( * ) Notice: Subject to any disclaimer, the term of this patent is extended or adjusted under 35 U.S.C. 154(b) by 0 days.

(21) Appl. No.: 13/799,038

(22) Filed: Mar. 13, 2013

(65) Prior Publication Data
US 2014/0077464 A1 Mar. 20, 2014

(30) Foreign Application Priority Data
Sep. 18, 2012 (JP) ................................. 2012-204985

(51) Int. Cl.
*B60G 17/04* (2006.01)

(52) U.S. Cl.
USPC ............... 280/5.514; 280/6.157; 280/293; 280/304

(58) Field of Classification Search
USPC ........ 280/5.514, 6.157, 293, 304; 701/49, 37; 362/465, 466
See application file for complete search history.

(56) References Cited

U.S. PATENT DOCUMENTS

| | | | | |
|---|---|---|---|---|
| 4,709,934 A * | 12/1987 | Suzuki et al. | ............ | 280/6.157 |
| 4,733,875 A * | 3/1988 | Azuma et al. | ............ | 280/6.159 |
| 5,086,866 A * | 2/1992 | Banjo et al. | ............ | 180/219 |
| 5,211,420 A * | 5/1993 | Iwashita | ............ | 280/5.503 |
| 5,711,390 A * | 1/1998 | Hikichi et al. | ............ | 180/219 |
| 6,229,263 B1 * | 5/2001 | Izawa | ............ | 315/80 |
| 6,276,707 B1 * | 8/2001 | Ungvari | ............ | 280/293 |
| 7,681,902 B2 * | 3/2010 | Suzuki et al. | ............ | 280/303 |
| 8,019,512 B2 * | 9/2011 | Kamioka et al. | ............ | 701/49 |
| 8,024,093 B2 * | 9/2011 | Nishijima et al. | ............ | 701/49 |
| 2005/0077691 A1 * | 4/2005 | Witters | ............ | 280/5.514 |
| 2011/0042908 A1 * | 2/2011 | Nolin | ............ | 280/6.157 |
| 2011/0202236 A1 * | 8/2011 | Galasso et al. | ............ | 701/37 |
| 2011/0301824 A1 * | 12/2011 | Nelson et al. | ............ | 701/102 |
| 2012/0123647 A1 * | 5/2012 | Doi et al. | ............ | 701/49 |

FOREIGN PATENT DOCUMENTS

JP 1996-022680 B 10/1986

* cited by examiner

*Primary Examiner* — Ruth Ilan
*Assistant Examiner* — Darlene P Condra
(74) *Attorney, Agent, or Firm* — Keith H. Orum; Orum & Roth, LLC

(57) ABSTRACT

An object of the present invention is to control according to a vehicle height an auxiliary device provided in a vehicle. A motorcycle 1 having a damper 10A interposed between a vehicle body and an axle includes vehicle height detection means 80 for detecting a vehicle height, with this vehicle height detection means being provided in the damper 10A in an auxiliary manner. The optical axis of a headlight 210, which is an exemplar auxiliary device provided in the vehicle, is controlled based on a detection signal from the vehicle height detection means 80.

9 Claims, 10 Drawing Sheets

MOTORCYCLE

BACKGROUND OF THE INVENTION

1. Field of the Invention

The present invention relates to a motorcycle.

2. Description of the Related Art

A motor cycle is described in Japanese Examined Patent Publication No. H8-22680. Japanese Examined Patent Publication No. H8-22680 relates to a vehicle height control device for a vehicle utilizing a hydraulic damper, and more particularly to a two-level vehicle-height control device that reduces the height of the vehicle while the vehicle is stopped and that increases the vehicle height while the vehicle is traveling. According to Japanese Examined Patent Publication No. H8-22680, the vehicle height control device can utilize the telescopic motion of the hydraulic damper to extend the hydraulic damper to increase the vehicle height and to optionally change the vehicle height to a lower position.

Specifically, the vehicle height is optionally switched to a predetermined higher position or a predetermined lower position by utilizing oil discharged by a pumping operation of the hydraulic damper to selectively switch, via a manual operation or an automatic operation, a control valve between a position where the vehicle height is increased and a position where the vehicle height is reduced.

[Patent Literature 1] Japanese Examined Patent Publication No. H8-22680

The motorcycle described in Japanese Examined Patent Publication No. H8-22680 has no function to control auxiliary devices provided in the vehicle in an auxiliary manner according to the vehicle height.

However, if, for example, a headlight, which is an auxiliary device, has an optical axis fixed in the same position both during stoppage when the vehicle height is small and during travel when the vehicle height is large, then inconveniently, for example, the range of illumination for the rider of the vehicle may be inappropriate or the vision of an oncoming driver may be hindered.

SUMMARY OF THE INVENTION

An object of the present invention is to control the auxiliary devices provided in the vehicle in an auxiliary manner according to the vehicle height.

One embodiment of the invention provides a motorcycle having a damper interposed between a vehicle body and an axle, the motorcycle including vehicle height detection means for detecting a vehicle height, the vehicle height detection means beings provided in the damper in an auxiliary manner, wherein an auxiliary device provided in the vehicle in an auxiliary manner is controlled based on a detection signal from the vehicle height detection means.

Another embodiment of the invention provides a motorcycle with a hydraulic jack provided in a damper interposed between a vehicle body and an axle, the hydraulic jack being actuated in a controllable manner to adjust a vehicle height of the vehicle body with respect to the axle, the motorcycle including vehicle height detection means for detecting the vehicle height and control means for actuating the hydraulic jack in a controllable manner based on a detection signal from the vehicle height detection means, wherein an auxiliary device provided in the vehicle in an auxiliary manner is controlled based on the detection signal from the vehicle height detection means.

In an embodiment of the invention, the auxiliary device is a headlight, and an optical axis of the headlight is adjusted according to the vehicle height based on the detection signal from the vehicle height detection means.

In an embodiment of the invention, the auxiliary device is a side stand, and a length of the side stand is adjusted according to the vehicle height during stoppage of the vehicle based on the detection signal from the vehicle height detection means.

In an embodiment of the invention, the auxiliary device is a rearview mirror, and a position of the rearview mirror is adjusted according to the vehicle height based on the detection signal from the vehicle height detection means.

In an embodiment of the invention, the auxiliary device is a brake with an ABS, and a threshold for a deceleration change rate of a wheel speed at which the ABS is actuated is adjusted according to the vehicle height based on the detection signal from the vehicle height detection means.

In the embodiment of the invention, the auxiliary device is a display device, and the vehicle height is displayed on the display device based on the detection signal from the vehicle height detection means.

In an embodiment of the invention, the power of an engine is adjusted based on the detection signal from the vehicle height detection means.

In an embodiment of the invention, a bank angle sensor is provided, and vehicle height control and actuation of the engine are stopped when the bank angle sensor detects falling of the motorcycle.

(a) The motorcycle includes the vehicle height detection means for detecting the vehicle height, and the vehicle height detection means is provided in the damper in an auxiliary manner to control the auxiliary device provided in the vehicle in an auxiliary manner based on the detection signal from the vehicle height detection means. Thus, the auxiliary device provided in the vehicle in an auxiliary manner can be controlled according to the vehicle height.

(b) The motorcycle includes the vehicle height detection means for detecting the vehicle height and the control means for actuating the hydraulic jack in a controllable manner based on the detection signal from the vehicle height detection means. The auxiliary device provided in the vehicle in an auxiliary manner is controlled based on the detection signal from the vehicle height detection means. Thus, the auxiliary device provided in the vehicle in an auxiliary manner can be controlled according to the vehicle height.

(c) The auxiliary device is a headlight, and the optical axis of the headlight is adjusted according to the vehicle height based on the detection signal from the vehicle height detection means.

Thus, however the vehicle height varies, the optical axis of the headlight is reset as appropriate according to the varying vehicle height. As a result, the appropriate range of illumination can be provided for the rider or the risk of hindering the vision of an oncoming driver can be eliminated.

(d) The auxiliary device is a side stand, and the length of the side stand is adjusted according to the vehicle height during stoppage of the vehicle based on the detection signal from the vehicle height detection means.

That is, if the vehicle is stopped with the increased vehicle height, the side stand may fail to reach the ground to cause the vehicle to fall down onto the ground. Thus, if the vehicle is stopped with the increased vehicle height, the side stand needs to be extended to allow the vehicle to be safely stopped. Hence, the vehicle height of the stopped vehicle is detected to allow the length of the side stand to be adjusted.

(e) The auxiliary device is a rearview mirror, and the position of the rearview mirror is adjusted according to the vehicle height based on the detection signal from the vehicle height detection means.

That is, however the vehicle height varies, the position of the rearview mirror is reset as appropriate according to the vehicle height. As a result, rear visibility is ensured.

(f) The auxiliary device is a brake with an ABS, and the threshold for the deceleration change rate of the wheel speed at which the ABS is actuated is adjusted according to the vehicle height based on the detection signal from the vehicle height detection means.

However the vehicle height varies, stable brake operability based on the ABS can be ensured.

(g) The auxiliary device is a display device, and the vehicle height is displayed on the display device based on the detection signal from the vehicle height detection means.

(h) The power of the engine is adjusted based on the detection signal from the vehicle height detection means.

(i) The bank angle sensor is provided, and the vehicle height control and the actuation of the engine can be stopped when the bank angle sensor detects falling of the motorcycle.

BRIEF DESCRIPTION OF THE DRAWINGS

FIG. 2A is a cross-sectional view showing an extension stroke, and FIG. 2B is a cross-sectional view showing a compression stroke;

FIG. 5A is a cross-sectional view showing an extension stroke, and FIG. 5B is a cross-sectional view showing a compression stroke;

DESCRIPTION OF THE PREFERRED EMBODIMENTS

Figure 1:
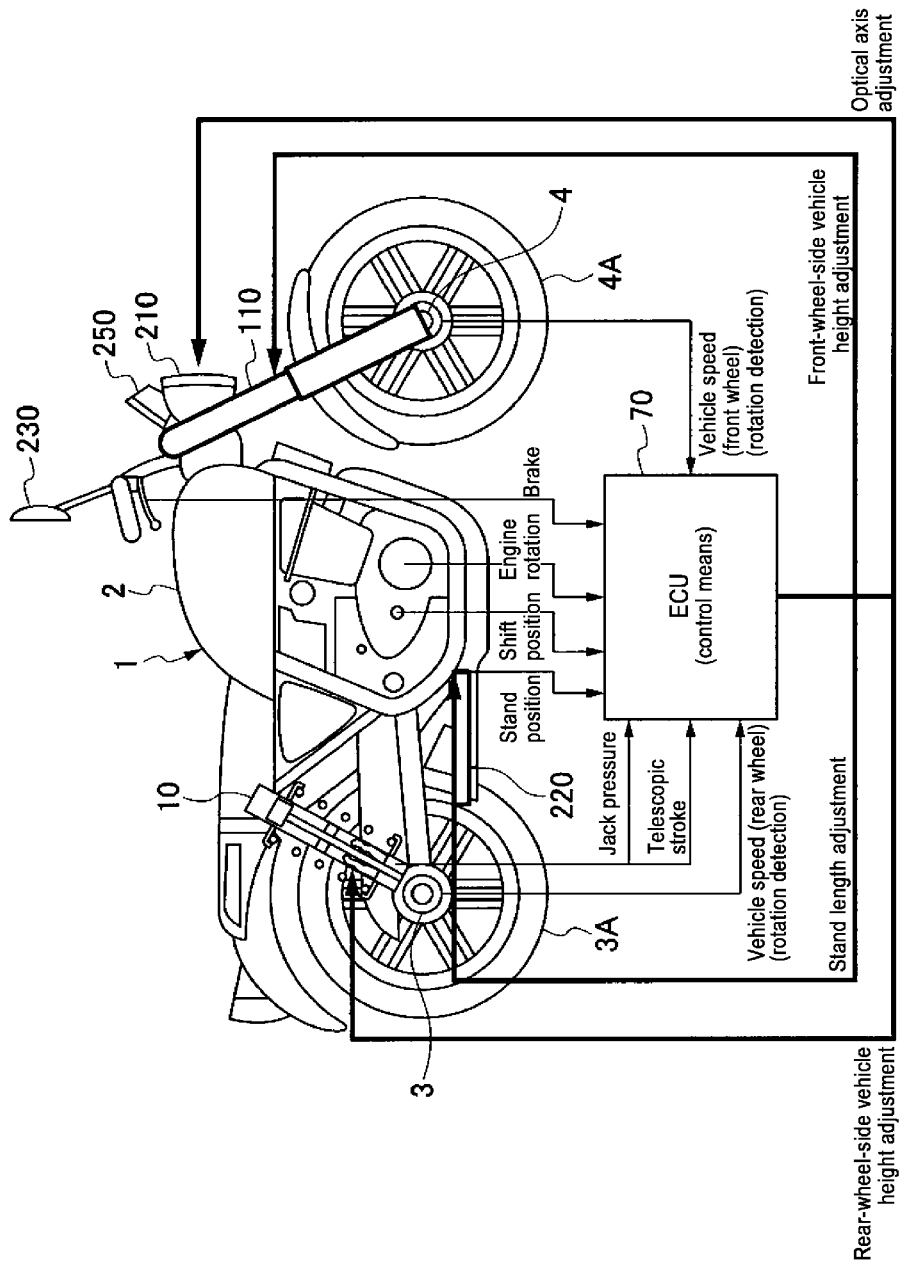
FIG. 1 is a schematic side view showing a motorcycle.
Figure 2:
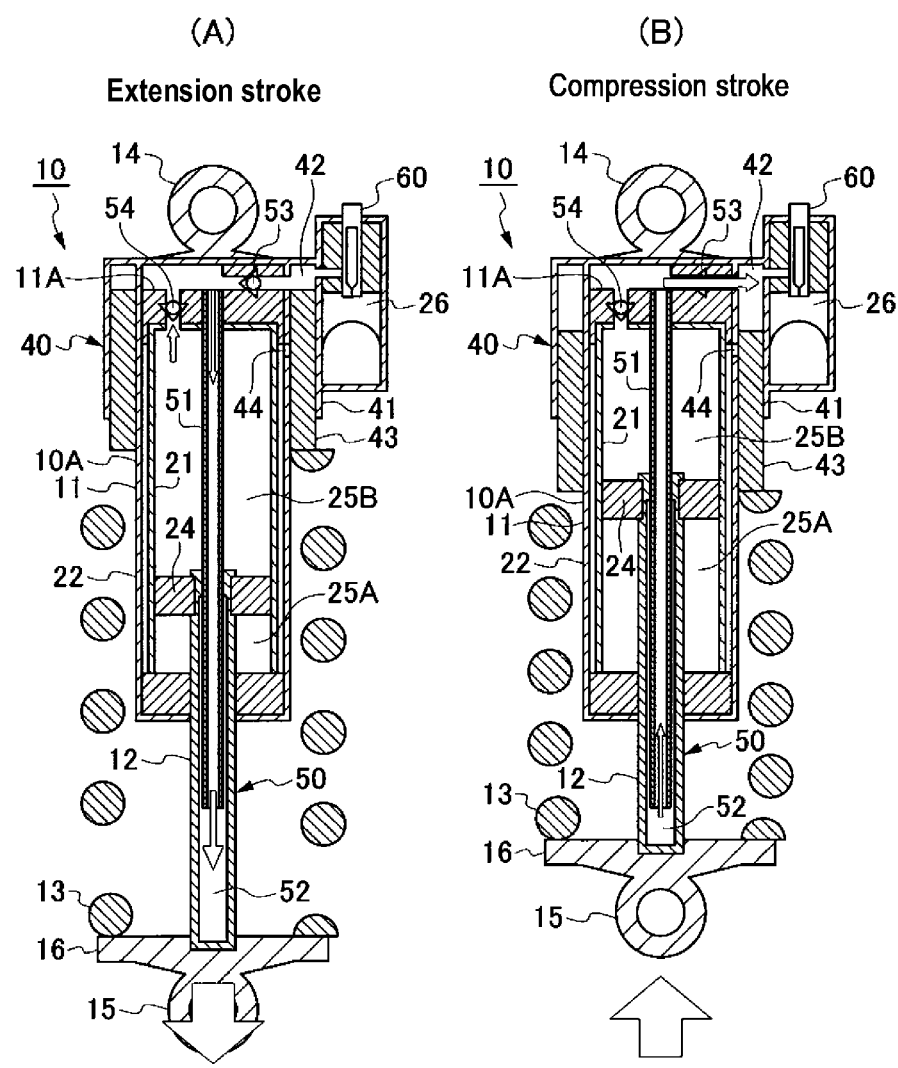
FIG. 2 shows a vehicle height increasing control mode of a rear suspension.

A motorcycle 1 shown in FIG. 1 includes a rear suspension 10 installed between a vehicle body 2 and a rear axle 3 (rear wheel 3A) and a front fork 110 installed between the vehicle body 2 and a front axle 4 (front wheel 4A).

Rear suspension 10 (FIG. 2 to FIG. 4 and FIG. 8 to FIG. 10)

The rear suspension 10 has a damper 10A shown in FIG. 2 to FIG. 4 and FIG. 7. The damper 10A has a damper tube 11 attached to the vehicle body side and a piston rod 12 attached to the axle side. The piston rod 12 slides through the damper tube 11 via a piston 24 to extend and contract with respect to the damper tube 11. The piston rod 12 has a suspension spring 13 arranged along the outer periphery of the damper tube 11 and the piston rod 12. The damper tube 11 includes a vehicle body-side attachment member 14 fixed to an upper end portion thereof. The piston rod 12 includes an axle-side attachment member 15 fixed to a lower end portion thereof.

The damper tube 11 includes a hydraulic jack 41 of a rear-wheel-side vehicle height adjustment device 40 provided around an outer peripheral portion of an upper end side of the damper tube 11. A plunger 43 that partitions a jack chamber 42 is inserted into the hydraulic jack 41. An upper end of the suspension spring 13 is supported by the plunger 43. A lower end of the suspension spring 13 is supported by a spring receiver 16 provided on the axle-side attachment member 15.

In the rear suspension 10, the damper tube 11 is a double tube including an inner tube 21 and an outer tube 22. The piston 24 is fixed to an end of the piston rod 12 that is inserted into the inner tube 21. The rear suspension 10 includes a lower oil chamber 25A and an upper oil chamber 25B formed inside the inner tube 21 and partitioned by the piston 24, and an oil reservoir chamber 26 formed around an outer periphery of the outer tube 22. Hydraulic oil is contained in the oil chambers 25A and 25B and the oil reservoir chamber 26. The oil reservoir chamber 26 is in constant communication with the lower oil chamber 25A or the upper oil chamber 25B to compensate for a lack of an amount of hydraulic oil equivalent to the volume of the piston rod 12 which lack is associated with extension and contraction of the rear suspension 10.

The rear suspension 10 has a damping force generator 27 (FIG. 8) in a communication path between the lower oil chamber 25A and the upper oil chamber 25B which path is provided in the piston 24 of the piston rod 12. The rear suspension 10 also has a damping force generator 28 (FIG. 8) in a communication path between the upper oil chamber 25B and the oil reservoir chamber 26 which path is provided in the damper tube 11. The damping force generators 27 and 28 dampen telescopic vibration of the damper tube 11 and the piston rod 12 associated with the absorption, by the suspension spring 13, of impact force from the road surface.

As shown in FIG. 2 to FIG. 4 and FIG. 8, the rear-wheel-side vehicle height adjustment device 40 includes the hydraulic jack 41 provided around the outer periphery of the outer tube 22 in the damper tube 11. The hydraulic jack 41 includes the plunger 43 that partitions the jack chamber 42. The plunger 43 is stuck out from the jack chamber 42 by hydraulic oil fed to the jack chamber 42 and supports the upper end of the suspension spring 13 on a lower surface of the plunger 43.

Figure 4:
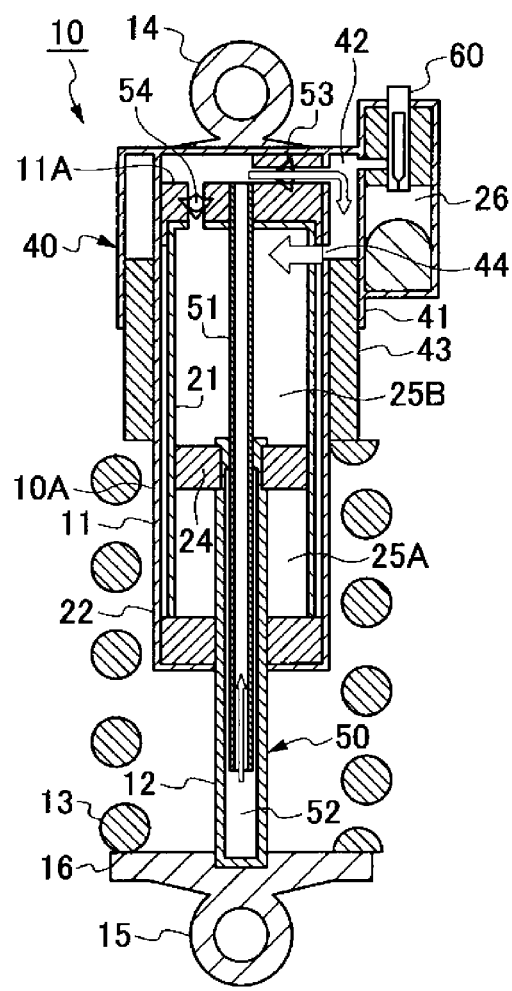
FIG. 4 is a cross-sectional view showing a vehicle height retention mode of the rear suspension.

The hydraulic jack 41 has an oil return passage 44 provided in the outer tube 22 and through which the hydraulic oil in the jack chamber 42 returns to the oil reservoir chamber 26 when the plunger 43 reaches a projecting end projecting from the jack chamber 42 (FIG. 4).

The rear-wheel-side vehicle height adjustment device 40 has a hydraulic pump 50 that performs a pumping operation in conjunction with the telescopic motion of the piston rod 12 with respect to the damper tube 11 to feed and discharge hydraulic oil to and from the jack chamber 42 in the hydraulic jack 41.

The hydraulic pump 50 includes a hollow pipe 51 provided upright in an end piece 11A of the damper tube 11 and inserted, in a slidable manner, into a pump chamber 52 formed by a hollow portion of the piston rod 12.

The hydraulic pump 50 includes a discharge check valve 53 allowing the hydraulic oil in the pump chamber 52 pressurized by the contracting motion of the piston rod 12 entering the damper tube 11 and the hollow tube 51 to be discharged toward the hydraulic jack 41 (FIG. 2B). The hydraulic pump 50 also includes a suction check valve 54 allowing the hydraulic oil in the inner tube 21 of the damper tube 11 to be sucked into the pump chamber 52 subjected to negative pressure by the extending motion of the piston rod 12 withdrawn from the damper tube 11 and the hollow pipe 51 (FIG. 2A).

Thus, the hydraulic pump 50 performs a pumping operation in conjunction with the telescopic motion of the piston rod 12 moving forward and backward with respect to the damper tube 11 and the hollow pipe 51 when the rear suspension 10 is vibrated by recesses and protrusions on the road surface while the vehicle is traveling. When the pump chamber 52 is pressurized by the pumping operation associated with the contracting motion of the piston rod 12, the oil in the pump chamber 52 opens the discharge check valve 53 and is discharged toward the hydraulic jack 41. When the pump chamber 52 is subjected to negative pressure by the pumping operation associated with the extending motion of the piston rod 12, the oil in the upper oil chamber 25B in the damper tube 11 opens the suction check valve 54 and is sucked into the pump chamber 52.

Figure 3:
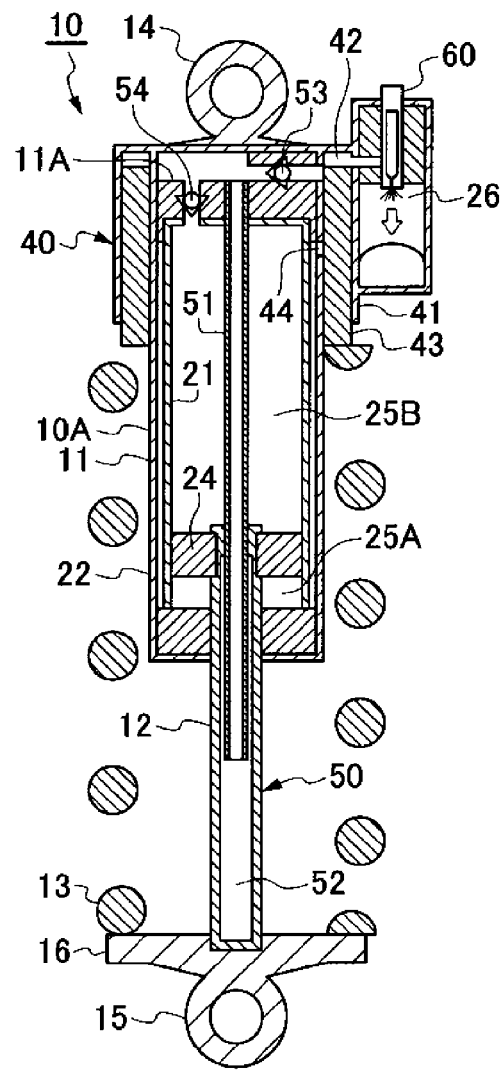
FIG. 3 is a cross-sectional view showing a vehicle height reducing control mode of the rear suspension.
Figure 8:
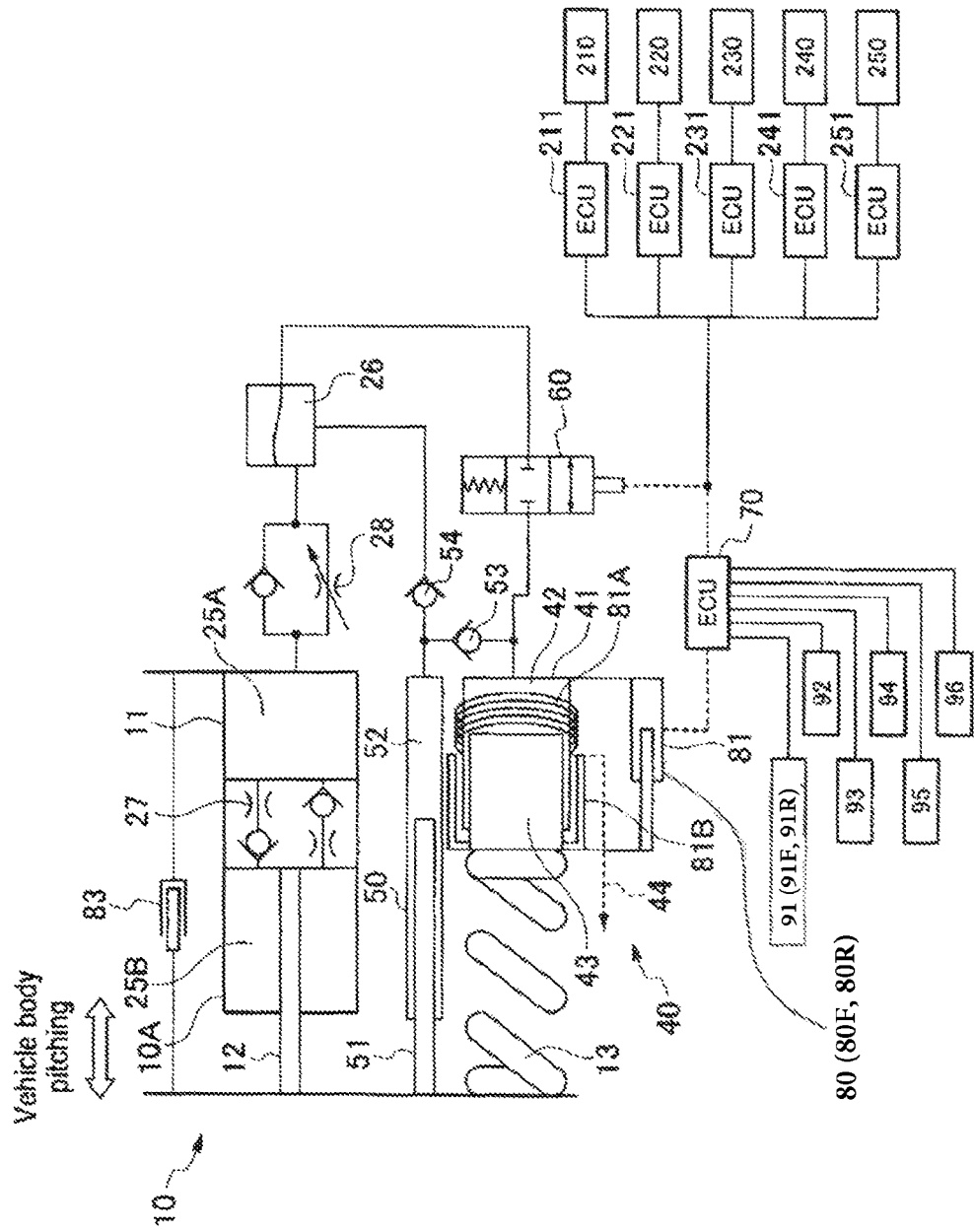
FIG. 8 is a control circuit diagram showing a vehicle height adjustment device.
Figure 9:
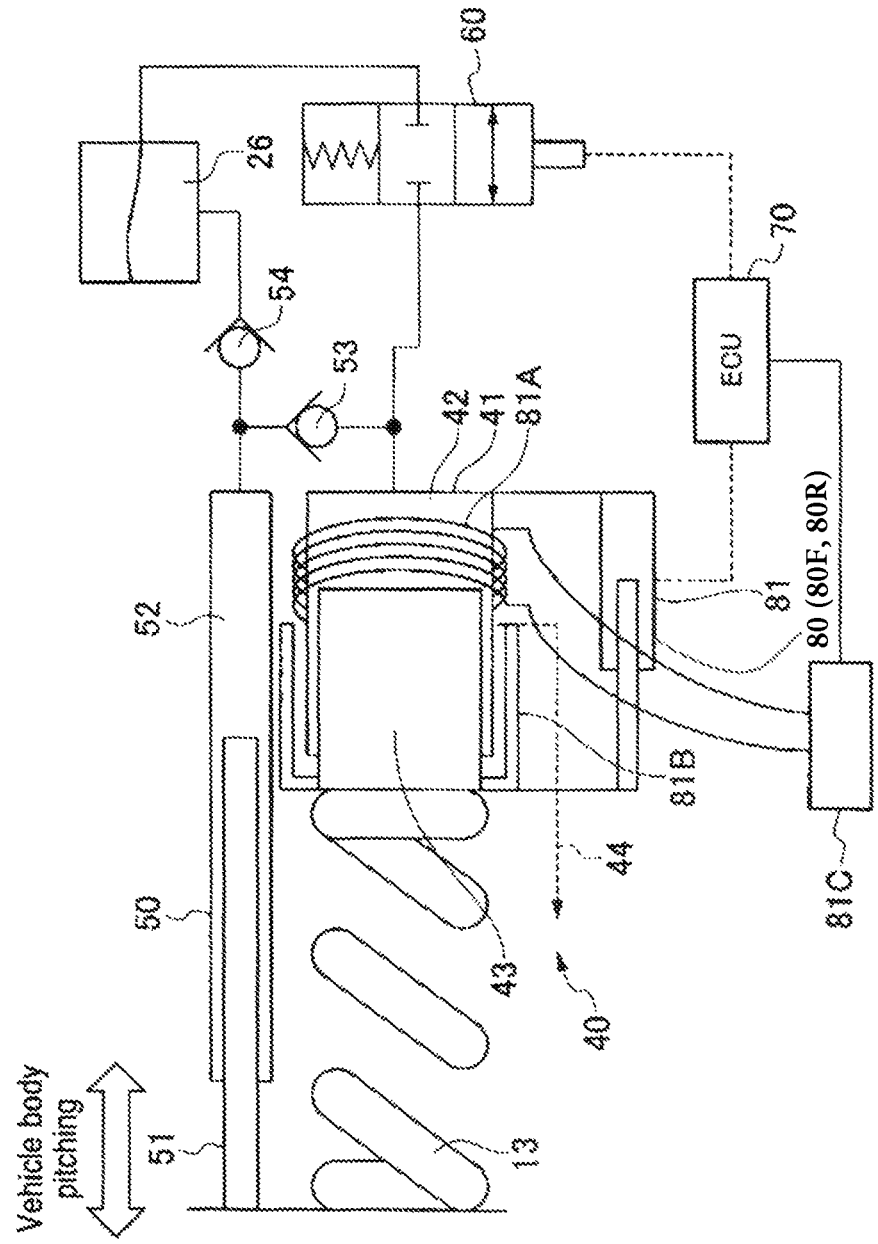
FIG. 9 is a circuit diagram showing an example of a control circuit.

The rear-wheel-side vehicle height adjustment device 40 has a selector valve 60 that is closed to stop the feeding of hydraulic oil to the jack chamber 42 in the hydraulic jack 41 or opened to discharge the hydraulic oil into the oil reservoir chamber 26 (or the oil chamber 25A or 25B in the damper tube 11) as shown in FIG. 3. The rear-wheel-side vehicle height adjustment device 40 has a control circuit as shown in FIG. 8 and FIG. 9. An ECU (control means) 70 opens and closes the selector valve 60 in a controllable manner to adjust the level of the hydraulic oil fed into the jack chamber 42 in the hydraulic chamber 41 by the hydraulic pump 50, which performs a pumping operation in conjunction with the telescopic motion of the piston rod 12 with respect to the damper tube 11. This further adjusts the projection height of the plunger 43 projecting from the jack chamber 42, thus controlling the vehicle height.

Figure 5:
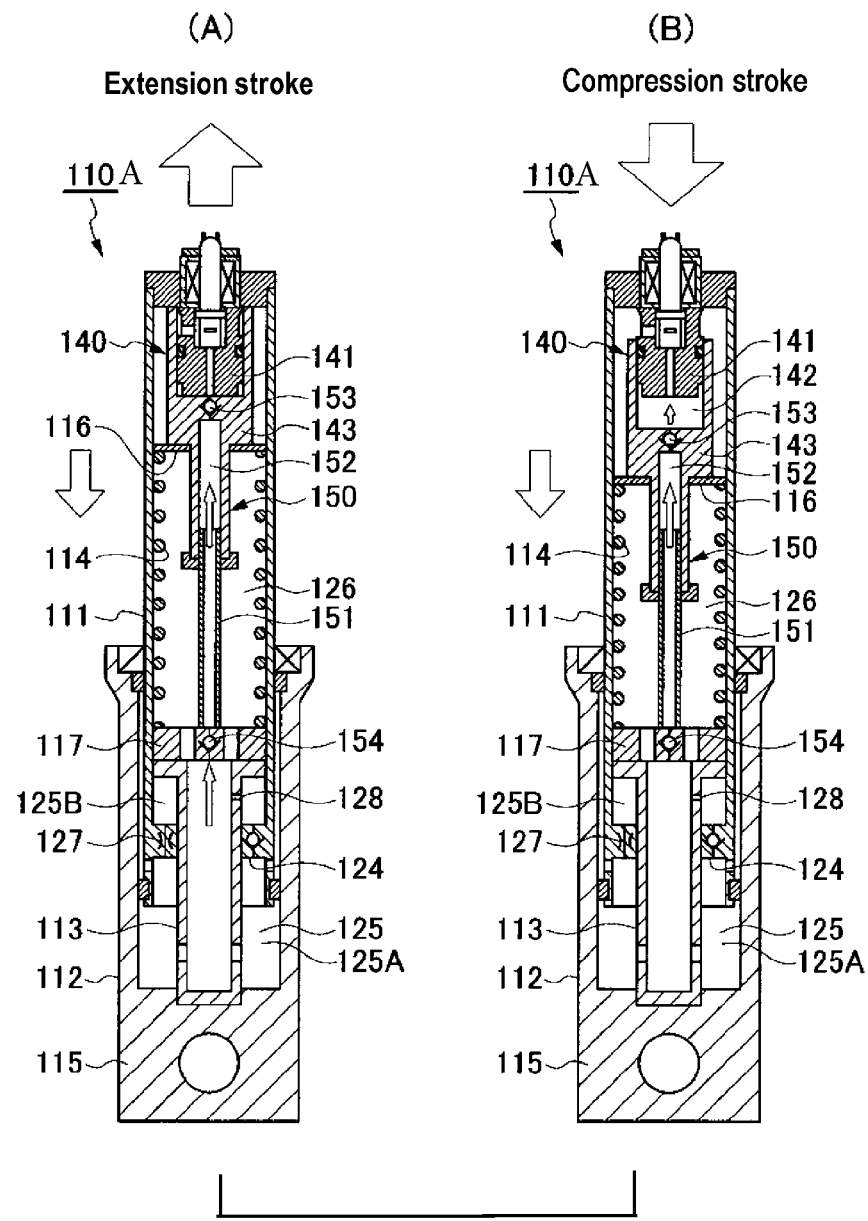
FIG. 5 shows a vehicle height increasing control mode of a front fork.
Figure 6:
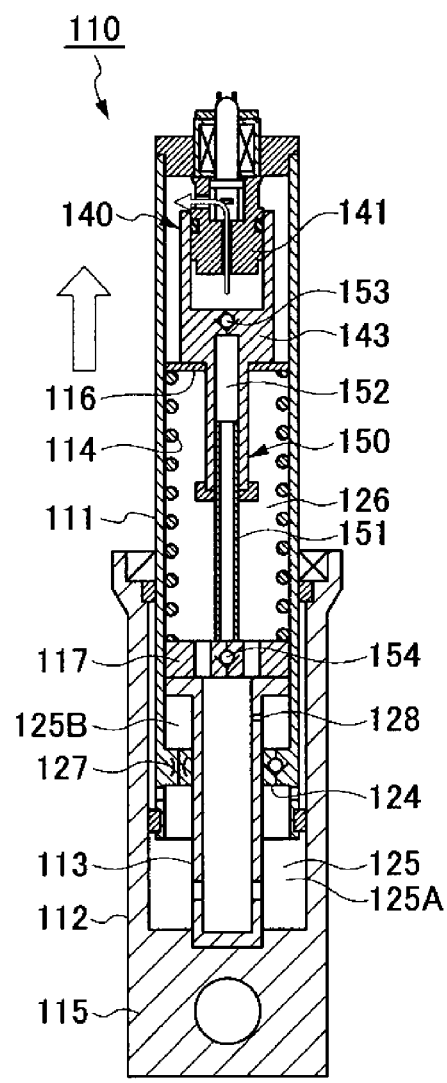
FIG. 6 is a cross-sectional view showing a vehicle height reducing control mode of the front fork.
Figure 7:
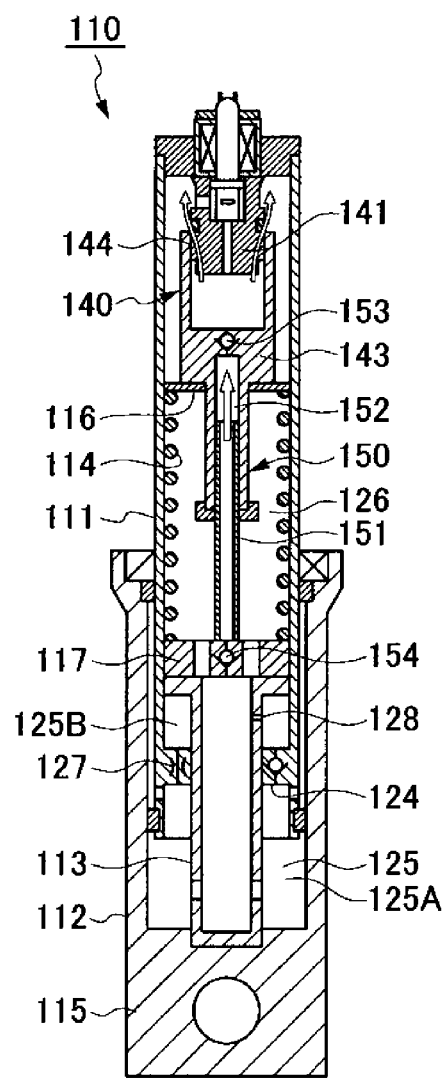
FIG. 7 is a cross-sectional view showing a vehicle height retention mode of the front fork.

Front fork 110 (FIG. 5 to FIG. 7)

As shown in FIG. 5 to FIG. 7, the front fork 110 has a damper 110A. The damper 110A has a damper tube 111 attached to the vehicle body side and a bottom tube 112 and a piston rod 113 both attached to the axle side. The damper tube 111 is inserted into the bottom tube 112 through an upper end opening of the bottom tube 112 in a slidable manner. The piston rod 113 is provided upright in the internal center of the bottom tube 112, and slides through an oil chamber 125 located on a lower end side of the damper tube 111 to extend and contract with respect to the damper tube 111. A suspension spring 114 is arranged in an oil reservoir chamber 126 located on an upper end side of the damper tube 111. A vehicle body-side attachment member (not shown in the drawings) is fixed to the upper end portion of the damper tube 111. An axle-side attachment member 115 is fixed to a lower end portion of the bottom tube 112.

A hydraulic jack 141 of a front-wheel-side vehicle height adjustment device 140 is provided at the upper end portion of the damper tube 111. A plunger 143 that partitions the jack chamber 142 is fitted in the hydraulic jack 141. An upper end of the suspension spring 114 is supported by the plunger 143 via a spring receiver 116. A lower end of the suspension spring 114 is supported by an end piece and spring receiver 117 provided at an upper end portion of the piston rod 113.

The front fork 110 includes a piston 124 fixedly provided at the lower end side of the damper tube 111 and sliding over an outer periphery of the piston rod 113. The front fork 110 includes a lower oil chamber 125A and an upper oil chamber 125B formed around an outer periphery of the piston rod 113 and partitioned by the piston 124, and an oil reservoir chamber 126 formed inside an inner periphery of the piston rod 113 and an inner periphery of upper portion of the damper tube 111. Hydraulic oil is contained in the oil chambers 125A and 125B and the oil reservoir chamber 126. The oil reservoir chamber 126 is in constant communication with the lower oil chamber 125A or the upper oil chamber 125B to compensate for a lack of an amount of hydraulic oil equivalent to the volume of the damper tube 111 which lack is associated with extension and contraction of the front fork 110.

The front fork 110 has a damping force generator 127 in a communication path between the lower oil chamber 125A and the upper oil chamber 125B which path is provided in the piston 124 of the damper tube 111. The front fork 110 also has a damping force generator 128 in a communication path between both the lower oil chamber 125A and the upper oil chamber 125B and the oil reservoir chamber 126 which path is provided in the piston rod 113. The damping force generators 127 and 128 dampen telescopic vibration of the damper tube 111, the bottom tube 112, and piston rod 113 associated with the absorption, by the suspension spring 114, of impact force from the road surface.

As shown in FIG. 5 to FIG. 7, the front-wheel-side vehicle height adjustment device 140 includes the hydraulic jack 141 provided at the upper end portion of the damper tube 111. The hydraulic jack 141 includes the plunger 143 that partitions the jack chamber 142. The plunger 143 is stuck out from the jack chamber 142 by hydraulic oil fed to the jack chamber 142 and supports the upper end of the suspension spring 114 on a lower surface of the plunger 143.

The hydraulic jack 141 has an oil return passage 144 provided in the hydraulic jack 141 and through which the hydraulic oil in the jack chamber 142 returns to the oil reservoir chamber 126 when the plunger 143 reaches a projecting end projecting from the jack chamber 142 (FIG. 7).

The front-wheel-side vehicle height adjustment device 140 has a hydraulic pump 150 that performs a pumping operation in conjunction with the telescopic motion of the piston rod 113 with respect to the damper tube 111 to feed and discharge hydraulic oil to and from the jack chamber 142 of the hydraulic jack 141.

The hydraulic pump 150 includes a hollow pipe 151 provided upright in an end piece 117 of the piston rod 113 and inserted, in a slidable manner, into a pump chamber 152 formed by a hollow portion of the plunger 143.

The hydraulic pump 150 includes a discharge check valve 153 allowing the hydraulic oil in the pump chamber 152 pressurized by the contracting motion of the piston rod 113 and the hollow tube 151 entering the damper tube 111 to be discharged toward the hydraulic jack 141 (FIG. 5B). The hydraulic pump 150 also includes a suction check valve 154 allowing the hydraulic oil in the oil reservoir chamber 126 to be sucked into the pump chamber 152 subjected to negative pressure by the extending motion of the piston rod 113 and the hollow pipe 151 withdrawn from the damper tube 111 (FIG. 5A).

Thus, the hydraulic pump 150 performs a pumping operation in conjunction with the telescopic motion of the piston rod 113 and the hollow pipe 151 moving forward and backward with respect to the damper tube 111 when the front fork 110 is vibrated by recesses and protrusions on the road surface while the vehicle is traveling. When the pump chamber 152 is pressurized by the pumping operation associated with the contracting motion of the piston rod 113, the oil in the pump chamber 152 opens the discharge check valve 153 and is discharged toward the hydraulic jack 141. When the pump chamber 152 is subjected to negative pressure by the pumping operation associated with the extending motion of the piston rod 113, the oil in the oil reservoir chamber 126 opens the suction check valve 154 and is sucked into the pump chamber 152.

The front-wheel-side vehicle height adjustment device 140 has a selector valve 160 (not shown in the drawings) that is closed to stop the feeding of hydraulic oil to the jack chamber 142 in the hydraulic jack 141 or opened to discharge the hydraulic oil into the oil reservoir chamber 126 as shown in FIG. 6. The front-wheel-side vehicle height adjustment device 140 has a control circuit similar to the control circuit in the rear-wheel-side vehicle height adjustment device 40 shown in FIG. 8 and FIG. 9. The ECU (control means) 70 opens and closes the selector valve 160 in a controllable manner to adjust the level of the hydraulic oil fed into the jack chamber 142 in the hydraulic chamber 141 by the hydraulic pump 150, which performs a pumping operation in conjunction with the telescopic motion of the piston rod 113 with respect to the damper tube 111. This further adjusts the projection height of the plunger 143 projecting from the jack chamber 142, thus controlling the vehicle height.

The ECU 70 according to the present embodiment turns on and off the selector valve 60 (or selector valve 160), including a solenoid valve, in a controllable manner via detection signals from vehicle height detection means 80 (front-wheel-side vehicle height detection means 80F and rear-wheel-side vehicle height detection means 80R), a vehicle speed sensor 91 (front-wheel vehicle speed sensor 91F and rear-wheel vehicle speed sensor 91R), a shift position sensor 92, a G sensor (acceleration and deceleration sensor) 93, a side stand sensor 94, an engine rotation sensor 95, a brake sensor 96, and the like.

The adoptable vehicle height detection means 80 (front-wheel-side vehicle height detection means 80F and rear-wheel-side vehicle height detection means 80R) may be one of projection height detection means 81 for detecting the projection height of the plunger 43 in the hydraulic jack 41 (or the plunger 143 in the hydraulic jack 141), hydraulic-pressure detection means 82 for detecting the hydraulic pressure in the jack chamber 42 in the hydraulic jack 41 (or the jack chamber 142 in the hydraulic jack 141), and telescopic-stroke-length detection means 83 for detecting the telescopic stroke length of the piston rod 12 with respect to the damper tube 11 (or the piston rod 113 with respect to the damper tube 111), or a combination of at least two of these means.

Specifically, for example, as shown in FIG. 8, the projection height detection means 81 for the plunger 43 includes, for example, a coil 81A wound around an outer periphery of the hydraulic jack 41 and a cover 81B provided on the plunger 43 so as to cover the outer periphery of the hydraulic jack 41. The projection height detection means 81 changes the impedance of the coil 81A depending on displacement of the plunger 43. An output from the coil 81A is transmitted to the ECU 70 via a signal processing circuit 81C. The ECU 70 detects the projection height of the plunger 43 based on the oscillation frequency of the coil 81A output by the signal processing circuit 81C.

The rear-wheel-side vehicle height adjustment device 40 in the rear suspension 10 adopting the control circuit in FIG. 8 and FIG. 9 with the selector valve 60, which includes a single two-port two-position solenoid valve, will be described in detail in connection with a vehicle height adjusting operation of the motorcycle 1. A height adjusting operation by the front-wheel-side vehicle height adjustment device 140 in the front fork 110 is substantially similar to the vehicle height adjusting operation performed by the rear-wheel-side vehicle height adjustment device 40.

In a vehicle height reducing control mode in which the ECU 70 outputs an ON signal, the selector valve 60 is opened to connect the jack chamber 42 in the hydraulic jack 41 to the oil reservoir chamber 26 in the damper tube 11. Thus, hydraulic oil fed into the jack chamber 42 in the hydraulic jack 41 by the hydraulic pump 50 is discharged into the oil reservoir chamber 26. This lowers the level of the oil in the jack chamber 42 and thus the projection height of the plunger 43, enabling a vehicle height reducing operation.

On the other hand, in the vehicle height increasing control mode in which the ECU 70 outputs an OFF signal, the selector valve 60 is closed to shut the jack chamber 42 in the hydraulic jack 41 off from the oil reservoir chamber 26 in the damper tube 11, with the hydraulic pump 50 being prevented from discharging the hydraulic oil fed into the jack chamber 42 in the hydraulic jack 41. This enables a vehicle height maintaining operation or a vehicle height increasing operation. At this time, the hydraulic pump 50 performs a pumping operation in conjunction with the extending motion of the piston rod 12 to enable the oil in the lower oil chamber 25A in the damper tube 11 to be sucked into the pump chamber 52 via the suction check valve 54. Then, the hydraulic pump 50 performs a pumping operation in conjunction with the contracting motion of the piston rod 12 to feed the oil in the pump chamber 52 into the jack chamber 42 in the hydraulic jack 41 via the discharge check valve 53. This enables a vehicle height increasing operation.

The selector valve 60 is a normally closed valve in FIG. 8 and FIG. 9 but may be a normally open valve.

Specifically, control modes carried out by the rear-wheel-side vehicle height adjustment device 40 are as follows.

(A) Vehicle Height Reducing Control Mode

In a vehicle height increasing control mode in which the selector valve 60 is closed to enable a vehicle height increasing operation while the vehicle is traveling or is stopped for a long time, the ECU 70 in the rear-wheel-side vehicle height adjustment device 40 shifts to a vehicle height reducing control mode in which the selector valve 60 is opened according to one of the following control conditions 1 to 3.

When opening the closed selector valve 60 after entering the vehicle height reducing control mode, the ECU 70 reduces an initial voltage applied to open the closed selector valve 60 (initial solenoid open voltage E1) to a solenoid open retention voltage E2 a given time after the valve opening during a open-valve retention stage. Thus, a solenoid current fed to the selector valve 60 is saved. For example, E1=12 V and E2=4 V.

Furthermore, while the solenoid is in the open-valve retention state, application of a normal voltage (activation voltage) at regular time intervals allows possible malfunction caused by vibration or the like to be prevented and enables recovery from the malfunction state.

1. Vehicle Speed Control

When the vehicle speed V is equal to or lower than a vehicle height reducing vehicle speed Vd (V≤Vd), the ECU 70 enters the vehicle height reducing control mode to open the selector valve 60 to enable a vehicle height reducing operation.

The ECU 70 predefines the vehicle height reducing vehicle speed Vd, which is, for example, 10 km/h.

2. Stoppage Predicted Time Control

The ECU 70 predicts a stoppage predicted time T of the vehicle. When the predicted stoppage predicted time T is equal to or shorter than a predetermined reference stoppage time Ta (T≤Ta), the ECU 70 enters the vehicle height reducing control mode and opens the selector valve 60 to enable a vehicle height reducing operation.

The ECU 70 calculates deceleration from the vehicle speed or detects deceleration via the G sensor, to predict the stoppage predicted time T based on the deceleration.

The ECU 70 sets the reference stoppage time Ta equal to a time required to discharge the hydraulic oil filled in the jack chamber 42 in the hydraulic jack 41 (a time required to discharge the hydraulic oil from the jack chamber 42 into the oil reservoir chamber 26 in the damper tube 11 via the selector valve 60).

In this case, the ECU 70 predefines a reference vehicle speed Va at which the prediction of the stoppage predicted time T of the vehicle is to be started, and predicts the stoppage predicted time T when the vehicle speed V is equal to or lower than the reference vehicle speed Va (V≤Va).

In the stoppage predicted time control, the ECU 70 may enter the vehicle height reducing control mode and open the selector valve 60 to enable a vehicle height reducing operation when the deceleration α of the vehicle is equal to or higher than a predetermined reference deceleration αa (α≥αa), instead of using the control conditions that T≤Ta and that V≤Va as described above.

The ECU 70 predefines the reference vehicle speed Va, the reference stoppage time Ta, and the reference deceleration αa. The reference vehicle speed Va is, for example, 40 km/h, the reference stoppage time Ta is, for example, 2.5 sec, and the reference deceleration αa is, for example, 4 km/h/sec.

The stoppage predicted time is a parameter calculated from moment-by-moment vehicle motion parameters in a predictive manner and representing an amount of time until the traveling vehicle is stopped in the immediately near future. The stoppage predicted time has a time dimension.

The actual comparative operation may apparently involve no degree of "time" because, for example, the time dimension is divided into components for the respective sides of the comparison expression or comparison is carried out for each element.

For example, one of the simplest arithmetic expressions for stoppage time prediction is $T=-V/\alpha=-V \cdot dt/dV$ (arithmetic expression for assumed constant acceleration). However, all of the following three comparison expressions have the same meaning. Even with a difference in comparison method resulting from the convenience of arithmetic operations, all of the comparison expressions effectively mean comparison with the stoppage predicted time.

$$T<c (c \text{ is a threshold; here, } c=Ta)$$

$$V<-c \cdot \alpha$$

$$-\alpha>c \cdot V$$

In the example in which comparison is carried out for each element, for example, comparison may be performed for each of the elements V and α, used to calculate the stoppage time, as in $(V<c1) \cap (-\alpha>c2)$ (c1 and c2 are thresholds). The results are ANDed together.

In this case, $T=-V/\alpha$ and thus the following expression is possible:

$$Ta=(-c1)/(-c2)=c1/c2.$$

3. Side Stand Control

Upon detecting resetting of the side stand of the vehicle from a standby position to an operating position, the ECU 70 enters the vehicle height reducing control mode and opens the selector valve 60 to enable a vehicle height reducing operation. The following control may also be performed. The vehicle speed is monitored. When the vehicle speed is equal to or higher than a very low speed (for example, 5 km/s), the ECU 70 avoids the reducing control even if the stand is in the operating position. The ECU 70 performs the reducing control only when the vehicle speed is zero.

(B) Vehicle Height Increasing Control Mode

In the vehicle height reducing control mode in which the selector valve 60 is opened and kept open as described in (A), the ECU 70 in the rear-wheel-side vehicle height adjustment device 40 shifts to the vehicle height increasing control mode in which the selector valve 60 is closed according to one of the following control conditions 1 to 4.

When entering the vehicle height increasing control mode to close the open selector valve 60, the ECU 70 turns off a voltage E0 applied to the selector valve 60 (E0=0 V).

1. Vehicle Speed Control

When the vehicle speed V exceeds the vehicle height reducing vehicle speed Vd (or a vehicle height increasing vehicle speed Vu set independently of the vehicle height reducing vehicle speed Vd) (V>Vd or V>Vu), the ECU 70 halts the vehicle height reducing control mode, enters the vehicle height increasing control mode, and closes the selector valve 60 to enable a vehicle height increasing operation.

The ECU 70 predefines the vehicle height reducing vehicle speed Vd (or the vehicle height increasing vehicle speed Vu). The height reducing vehicle speed Vd or the vehicle height increasing vehicle speed Vu is, for example, 40 km/h.

2. Parking Prediction Time Control

The ECU 70 predicts the stoppage predicted time T of the vehicle. When the predicted stoppage predicted time T exceeds a predetermined secondary reference stoppage time Tb (T>Tb), the ECU 70 halts the vehicle height reducing control mode, enters the vehicle height increasing control mode, and closes the selector valve 60 to enable a vehicle height increasing operation.

The ECU 70 predicts the stoppage predicted time T of the vehicle based on the deceleration (or acceleration) of the vehicle.

At this time, the ECU 70 predefines a secondary reference vehicle speed Vb at which the prediction of the stoppage time T of the vehicle is to be started. When the vehicle speed V exceeds the secondary reference vehicle speed Vb (V>Vb), the ECU 70 predicts the stoppage predicted time T.

In the stoppage predicted time control, the ECU 70 may halt the vehicle height reducing control mode, enter the vehicle height increasing control mode, and close the selector valve 60 to enable a vehicle height increasing operation when the acceleration β of the vehicle exceeds a predetermined reference acceleration βb (β>βb) instead of using the control conditions that T>Tb and that V>Vb as described above.

The ECU 70 predefines the secondary reference vehicle speed Vb, the secondary reference stoppage time Tb, and the reference acceleration βb. The secondary reference vehicle speed Vb is, for example, 40 km/h, the secondary reference stoppage time Tb is, for example, 3 sec, and the reference acceleration βb is, for example, 5 km/h/sec.

3. Long-Stoppage Control

When the stoppage time of the vehicle is equal to or longer than a predetermined continued stoppage time Tc, the ECU 70 halts the vehicle height reducing control mode, enters the vehicle height increasing control mode, and closes the selector valve 60 to enable a vehicle height increasing operation.

The ECU 70 predefines the continued stoppage time Tc of the vehicle. The continued stoppage time Tc is, for example, 30 sec.

4. Neutral Control

When the vehicle speed V=0 and the vehicle is in a neutral shift position, the ECU 70 halts the vehicle height reducing control mode, enters the vehicle height increasing control mode, and closes the selector valve 60 to enable a vehicle height increasing operation.

(c) Height Retention Mode

While the vehicle is traveling, the ECU 70 in the rear-wheel-side vehicle height adjustment device 40 retains the vehicle height at any intermediate height position preset as desired by opening and closing the selector valve 60 in a controllable manner based on a detection result from the vehicle height detection means 80 (rear-wheel-side vehicle height detection means 80R).

Figure 10:
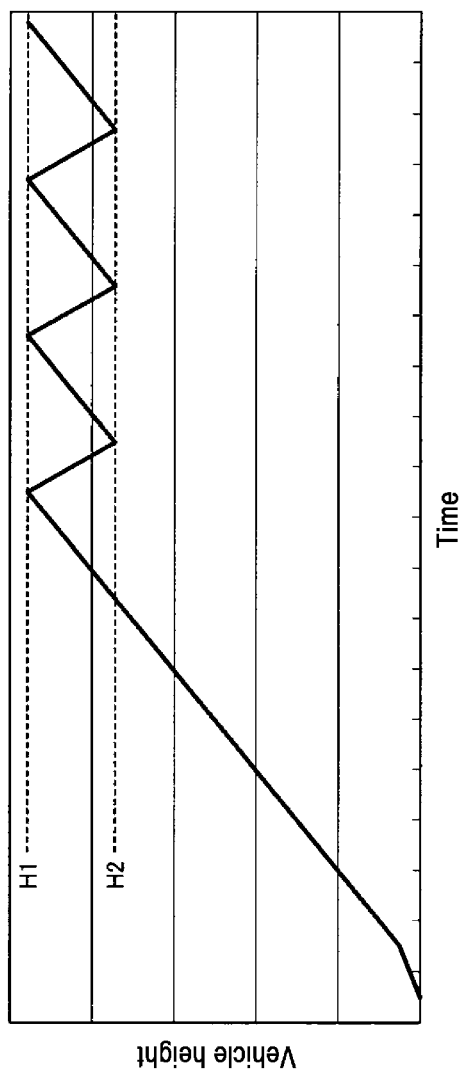
FIG. 10 is a diagram showing how the vehicle height is adjusted.

That is, the ECU 70 switches the selector valve 60 from an OFF operation (height increasing control mode) to an ON operation to open the selector valve 60 and sets an upper threshold for the vehicle at which the vehicle height starts to be reduced, to H1. The ECU 70 switches the selector valve 60 from the ON operation (height reducing control mode) to the OFF operation to close the selector valve 60 and sets a lower threshold for the vehicle at which the vehicle height starts to be increased, to H2. Thus, the ECU 70 retains the vehicle height of the motorcycle 1 during travel at an intermediate height position between H1 and H2 based on the detection result from the vehicle height detection means 80, as shown in FIG. 10.

Thus, the rear-wheel-side vehicle height adjustment device 40 as described above may retain the vehicle height at any intermediate height position between the maximum height position defined by the highest possible projection end of the plunger 43 in the hydraulic jack 41 and the minimum height position defined by the lowest possible sinking end of the plunger 43 in the hydraulic jack 41.

Furthermore, the vehicle height can be instantaneously switched by adopting a solenoid valve as the selector valve 60 serving as the means for switching the vehicle height.

The vehicle height during the detection can be estimated by adopting the projection height detection means 81 for detecting the projection height of the plunger 43 in the hydraulic jack 41, as the vehicle height detection means 80 (rear-wheel-side vehicle height detection means 80R).

Furthermore, the vehicle height during the detection can be estimated by adopting the hydraulic-pressure detection means 82 for detecting the hydraulic pressure in the jack chamber 42 in the hydraulic jack 41 as the vehicle height detection means 80 (rear-wheel-side vehicle height detection device 80R). At this time, applying a filter (low pass) to the detection result from the hydraulic-pressure detection means 82 enables the vehicle weight (loading capacity) to be estimated. When the vehicle weight is high and the vehicle height begins to decrease, the vehicle height is increased to prevent the damper 10A from being contracted to the limit. When the vehicle weight is low and the vehicle height begins to increase, the vehicle height is reduced to prevent the damper 10A from being stretched to the limit.

Furthermore, the vehicle height during the detection can be estimated by adopting the telescopic-stroke-length detection means 83 for detecting the telescopic stroke length of the piston rod 12 with respect to the damper tube 11 as the vehicle height detection means 80 (rear-wheel-side vehicle height detection means 80R). At this time, applying a filter (band pass) to the detection result from the telescopic-stroke-length detection means 83 allows the recessed and protruding status (amplitude status) of the road surface to be estimated. When the road surface has a large amplitude, the vehicle height is increased to prevent the damper 10A from being contracted to the limit or is adjusted to an appropriate value to prevent the damper 10A both from being contracted to the limit and from being stretched to the limit. When the road surface has a small amplitude, the vehicle height is reduced to relax wind resistance if the vehicle is of an on-road type and to prevent the vehicle body from pitching if the vehicle is of an off-road type.

(D) Auxiliary-Device Control Mode

Based on a detection signal from the rear-wheel-side vehicle height detection means 80R, the ECU 70 in the rear-wheel-side vehicle height adjustment device 40 controls auxiliary devices provided in the vehicle in an auxiliary manner, for example, a headlight 210, a side stand 220, a rearview mirror 230, a brake 240 with an ABS, and a display device 250 as follows.

(Headlight 210)

Based on the detection signal from the rear-wheel-side vehicle height detection means 80R, the ECU 70 adjusts the position, inclination, and the like of the optical axis of the headlight 210 to the optimum condition according to the vehicle height. At this time, the ECU 70 makes the adjustment via an ECU 211 for the headlight 210.

Thus, however the vehicle height varies, the optical axis of the headlight 210 is reset as appropriate according to the varying vehicle height. As a result, the appropriate range of illumination can be provided for the rider or the risk of hindering the vision of an oncoming driver can be eliminated.

(Side Stand 220)

Based on the detection signal from the rear-wheel-side vehicle height detection means 80R, the ECU 70 adjusts the length of the side stand 220 according to the vehicle height of the stopped vehicle. At this time, the ECU 70 makes the adjustment via an ECU 221 for the side stand 220.

That is, if the vehicle is stopped with the increased vehicle height, the side stand 220 may fail to reach the ground to cause the vehicle to fall down onto the ground. Thus, if the vehicle is stopped with the increased vehicle height, the side stand 220 needs to be extended to allow the vehicle to be safely stopped. Hence, the vehicle height of the stopped vehicle is detected to allow the length of the side stand 220 to be adjusted.

(Rearview Mirror 230)

Based on the detection signal from the rear-wheel-side vehicle height detection means 80R, the ECU 70 adjusts the position of the rearview mirror 230 according to the vehicle height of the stopped vehicle. At this time, the ECU 70 makes the adjustment via an ECU 231 for the rearview mirror 230.

That is, however the vehicle height varies, the position of the rearview mirror 230 is reset as appropriate according to the vehicle height. As a result, rear visibility is ensured.

(Brake 240 with the ABS)

Based on the detection signal from the rear-wheel-side vehicle height detection means 80R, the ECU 70 adjusts according to the vehicle height a threshold for the deceleration change rate of a wheel speed at which the ABS of the brake 240 is actuated. At this time, the ECU 70 makes the adjustment via an ECU 241 for the brake 240 with the ABS.

That is, however the vehicle height varies, stable brake operability based on the ABS can be ensured.

Furthermore, the control of power of the engine (the control of injection) and the like can be performed via the ECU.

Moreover, an angle sensor that detects the inclination angle of the vehicle is provided. When the angle sensor detects that the angle of the vehicle body is indicative of a fallen state, the vehicle height adjustment system and further the engine are stopped in a controllable manner via the ECUs. Thus, useless control is avoided, and safety is ensured.

(Display Device 250)

Based on the detection signal from the rear-wheel-side vehicle height detection means 80R, the ECU 70 displays the vehicle height on the display device 250. At this time, the ECU 70 performs the display via an ECU 251 for the display device 250.

The height adjusting operation of the rear-wheel-side vehicle height adjustment device 40 adopted for the rear suspension 10 of the motorcycle 1 has been described. However, the front-wheel-side vehicle height adjustment device 140 adopted for the front fork 110 can perform, using the detection result from the front-wheel-side vehicle height detection means 80F, a vehicle height adjusting operation that is substantially the same as the (A) height reducing control mode, the (B) height increasing control mode, the (C) height retention mode, and the (D) auxiliary device control mode carried out by the rear-wheel-side vehicle height adjustment device 40.

(E) Front and Rear Vehicle Height Interlocking Control Mode

Now, the vehicle height adjusting operation of the rear suspension 10 in the motorcycle 1 will be described in conjunction with a vehicle height interlocking control mode that interlocks with the vehicle height adjusting operation of the front fork 100.

That is, the rear-wheel-side vehicle height adjustment device 40 in the rear suspension 10 has the hydraulic pump 50 that performs a pumping operation in conjunction with the telescopic motion of the piston rod 12 to discharge hydraulic oil, the hydraulic jack 41 including the plunger 43 that is stuck out by the hydraulic oil discharged by the hydraulic pump 50, and the suspension spring 13 supported by the plunger 43 in the hydraulic jack 41. The hydraulic jack 41 is actuated in a controllable manner based on a detection result from the rear-wheel-side vehicle height detection means 80R provided in the rear suspension 10 in an auxiliary manner, thus adjusting the rear-wheel-side vehicle height.

Furthermore, the front-wheel-side vehicle height adjustment device 140 in the front fork 110 has the hydraulic pump 150 that performs a pumping operation in conjunction with the telescopic motion of the piston rod 113 to discharge hydraulic oil, the hydraulic jack 141 including the plunger 143 that is stuck out by the hydraulic oil discharged by the hydraulic pump 150, and the suspension spring 114 supported by the plunger 143 in the hydraulic jack 141. The hydraulic jack 141 is actuated in a controllable manner based on a detection result from the front-wheel-side vehicle height detection means 80F provided in the front fork 110 in an auxiliary manner, thus adjusting the front-wheel-side vehicle height.

The motorcycle 1 adjusts the vehicle height by interlocking a rear-wheel-side vehicle height adjusting operation associated with controllable actuation of the hydraulic jack 41 provided in the rear-wheel-side vehicle height adjustment device 40 in the rear suspension 10 with a front-wheel-side vehicle height adjusting operation associated with controllable actuation of the hydraulic jack 141 provided in the front-wheel-side vehicle height adjustment device 140 in the rear suspension 110. This allows the rider's driving position to be stabilized in spite of a variation in the vehicle height of the motorcycle 1.

Thus, the ECU 70 in the motorcycle 1 can adjust the vehicle height by synchronizing the rear-wheel-side vehicle height adjusting operation performed by the rear-wheel-side vehicle height adjustment device 40 with the front-wheel-side vehicle height adjusting operation performed by the front-wheel-side vehicle height adjustment device 140. Hence, the vehicle body 2 can be displaced up and down with respect to the front and rear axles 3 and 4 and parallel to the front and rear axles 3 and 4, allowing the rider's driving position to be kept stable.

Furthermore, when the vehicle height of the motorcycle 1 is reduced using the rear-wheel-side vehicle height adjustment device 40 and the front-wheel-side vehicle height adjustment device 140, the ECU 70 can adjust the vehicle height by allowing the rear-wheel-side vehicle height adjustment device 40 to perform the rear-wheel-side vehicle height reducing operation before allowing the front-wheel-side vehicle height adjustment device 140 to perform the front-wheel-side vehicle height reducing operation. Thus, the rear-wheel-side vehicle height can be reduced earlier so that the rider's feet can more appropriately touch the ground when the vehicle is stopped.

Furthermore, if the vehicle body 2 already leans forward as a result of a brake operation for stopping the vehicle, the forward leaning of the vehicle body 2 can be reduced by performing a vehicle height reducing operation first on the rear wheel side and then on the front wheel side.

In the vehicle height interlocking control mode in which the rear suspension 10 and the front fork 100 control the vehicle height in an interlocking manner, the hydraulic pump 50 in the rear suspension 10 which performs a pumping operation in conjunction with the telescopic motion of the piston rod 12 to discharge hydraulic oil may be used as a hydraulic pump that feeds hydraulic oil both to the hydraulic jack 41 of the rear suspension 10 and to the hydraulic jack 141 of the front fork 100. However, the hydraulic pump 150 in the front fork 100 which performs a pumping operation in conjunction with the telescopic motion of the piston rod 124 to discharge hydraulic oil may be used as a hydraulic pump for the above-described vehicle height interlocking operation performed by the rear suspension 10 and the front fork 100.

The embodiment of the present invention has been described in detail with reference to the drawings. However, the specific configuration according to the present invention is not limited to the embodiment. For example, any changes made to the design of the embodiment without departing from the spirits of the present invention are included in the present invention. For example, the selector valve 60 is not limited to the solenoid valve but may be an electrically operable valve of any other type such as a rotary type or a puppet type.

An aspect of the present invention provides a motorcycle having a hydraulic jack provided in a damper interposed between a vehicle body and an axle, the hydraulic jack being actuated in a controllable manner to adjust a vehicle height of the vehicle body with respect to the axle, the motorcycle including vehicle height detection means for detecting the vehicle height and control means for actuating the hydraulic jack in a controllable manner based on a detection signal from the vehicle height detection means, wherein an auxiliary device provided in the vehicle in an auxiliary manner is controlled based on the detection signal from the vehicle height detection means. Thus, auxiliary devices provided in the vehicle in an auxiliary manner can be controlled according to the vehicle height.

EXPLANATION OF REFERENCE NUMERALS

1 Motorcycle
10A and 110A Damper
41 Hydraulic jack
70 ECU (control means)
80 Vehicle height detection means
210 Headlight
220 Side stand
230 Rearview mirror
240 Brake with ABS
250 Display device

What is claimed is:
1. A motorcycle having a damper interposed between a vehicle body and an axle, wherein the motorcycle comprising:
vehicle height detection means for detecting a vehicle height, the vehicle height detection means being provided in communication with the damper in an auxiliary manner, and
an auxiliary device provided in the motorcycle in an auxiliary manner, the auxiliary device being controlled based on a detection signal from the vehicle height detection means, wherein the auxiliary device is a side stand, and a length of the side stand is adjusted according to the vehicle height during stoppage of the vehicle based on the detection signal from the vehicle height detection means.

2. A motorcycle having a damper interposed between a vehicle body and an axle,
wherein the motorcycle comprising:
vehicle height detection means for detecting a vehicle height, the vehicle height detection means being provided in communication with the damper in an auxiliary manner, and
an auxiliary device provided in the motorcycle in an auxiliary manner, the auxiliary device being controlled based on a detection signal from the vehicle height detection means, wherein the auxiliary device is a rearview mirror, and a position of the rearview mirror is adjusted according to the vehicle height based on the detection signal from the vehicle height detection means.

3. A motorcycle having a damper interposed between a vehicle body and an axle,
wherein the motorcycle comprising:
vehicle height detection means for detecting a vehicle height, the vehicle height detection means being provided in communication with the damper in an auxiliary manner, and
an auxiliary device provided in the motorcycle in an auxiliary manner, the auxiliary device being controlled based on a detection signal from the vehicle height detection means, wherein the auxiliary device is a brake with an ABS, and a threshold for a deceleration change rate of a wheel speed at which the ABS is actuated is adjusted according to the vehicle height based on the detection signal from the vehicle height detection means.

4. A motorcycle having a damper interposed between a vehicle body and an axle,
wherein the motorcycle comprising:
vehicle height detection means for detecting a vehicle height, the vehicle height detection means being provided in communication with the damper in an auxiliary manner, and
an auxiliary device provided in the motorcycle in an auxiliary manner, the auxiliary device being controlled based on a detection signal from the vehicle height detection means, wherein the auxiliary device is a display device, and the vehicle height is displayed on the display device based on the detection signal from the vehicle height detection means.

5. A motorcycle having a damper interposed between a vehicle body and an axle,
wherein the motorcycle comprising:
vehicle height detection means for detecting a vehicle height, the vehicle height detection means being provided in communication with the damper in an auxiliary manner, and
an auxiliary device provided in the motorcycle in an auxiliary manner, the auxiliary device being controlled based on a detection signal from the vehicle height detection means, wherein power of an engine is adjusted based on the detection signal from the vehicle height detect on means,
wherein a bank angle sensor is provided, and vehicle height control and actuation of the engine are stopped when the bank angle sensor detects falling of the motorcycle.

6. A motorcycle having a hydraulic jack provided in a damper interposed between a vehicle body and an axle, the hydraulic jack being actuated in a controllable manner to adjust a vehicle height of the vehicle body with respect to the axle,
wherein the motorcycle comprising: vehicle height detection means for detecting the vehicle height
control means for actuating the hydraulic jack in a controllable manner based on a detection signal from the vehicle height detection means, and
an auxiliary device provided in the vehicle in an auxiliary manner, the auxiliary device being controlled based on the detection signal from the vehicle height detection means, wherein the auxiliary device is a side stand, and a length of the side stand is adjusted according to the vehicle height during stoppage of the vehicle based on the detection signal from the vehicle height detection means.

7. A motorcycle having a hydraulic jack provided in a damper interposed between a vehicle body and an axle, the hydraulic jack being actuated in a controllable manner to adjust a vehicle height of the vehicle body with respect to the axle,
wherein the motorcycle comprising: vehicle height detection means for detecting the vehicle height
control means for actuating the hydraulic jack in a controllable manner based on a detection signal from the vehicle height detection means, and
an auxiliary device provided in the vehicle in an auxiliary manner, the auxiliary device being controlled based on the detection signal from the vehicle height detection means, wherein the auxiliary device is a rearview mirror, and a position of the rearview mirror is adjusted according to the vehicle height based on the detection signal from the vehicle height detection means.

8. A motorcycle having a hydraulic jack provided in a damper interposed between a vehicle body and an axle, the hydraulic jack being actuated in a controllable manner to adjust a vehicle height of the vehicle body with respect to the axle,
wherein the motorcycle comprising: vehicle height detection means for detecting the vehicle height
control means for actuating the hydraulic jack in a controllable manner based on a detection signal from the vehicle height detection means, and
an auxiliary device provided in the vehicle in an auxiliary manner, the auxiliary device being controlled based on the detection signal from the vehicle height detection means, wherein the auxiliary device is a brake with an ABS, and a threshold for a deceleration change rate of a wheel speed at which the ABS is actuated is adjusted according to the vehicle height based on the detection signal from the vehicle height detection means.

9. A motorcycle having a hydraulic jack provided in a damper interposed between a vehicle body and an axle, the hydraulic jack being actuated in a controllable manner to adjust a vehicle height of the vehicle body with respect to the axle,
wherein the motorcycle comprising: vehicle height detection means for detecting the vehicle height control means for actuating the hydraulic jack in a controllable manner based on a detection signal from the vehicle height detection means, and an auxiliary device provided in the vehicle in an auxiliary manner, the auxiliary device being controlled based on the detection signal from the vehicle height detection means, wherein the auxiliary device is a display device, and the vehicle height is displayed on the display device based on the detection signal from the vehicle height detection means.

* * * * *